June 12, 1934. K. C. RANDALL 1,962,326
CONNECTER
Original Filed March 3, 1928
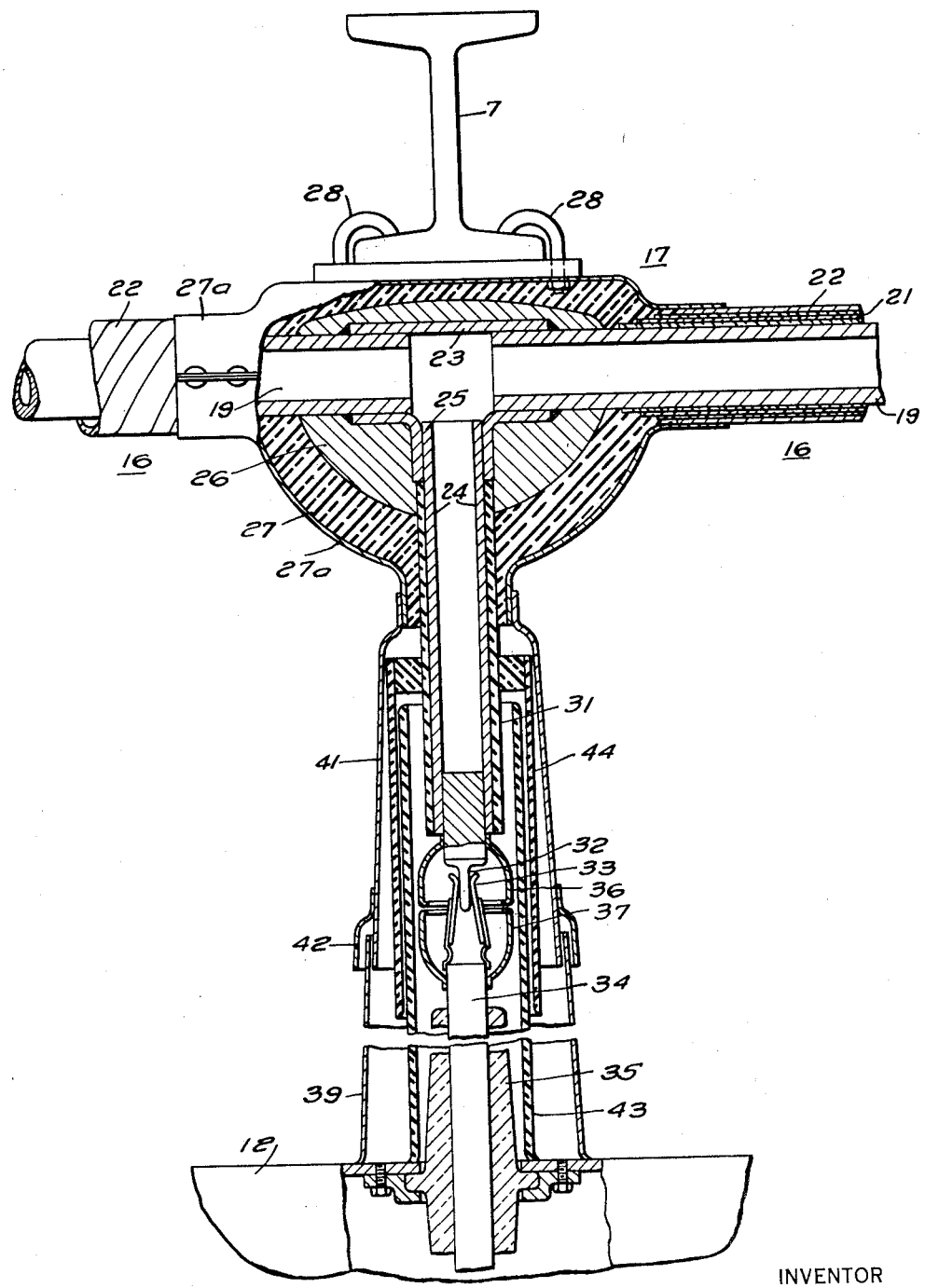
INVENTOR
Karl C. Randall.
BY
Chesley S. Carr
ATTORNEY Patented June 12, 1934

1,962,326

UNITED STATES PATENT OFFICE 1,962,326

CONNECTER

Karl C. Randall, Edgewood, Pa., assignor to Westinghouse Electric & Manufacturing Company, a corporation of Pennsylvania Original application March 3, 1928, Serial No. 258,865. Divided and this application July 25, 1929, Serial No. 380,821

6 Claims. (Cl. 173—363)

This application is a division of my application Serial No. 258,865, filed March 3, 1928, which has matured into Patent 1,818,160, August 11, 1931.

My invention relates to switchboard apparatus and particularly to bus bar connections and disconnecting switch contacts for circuit breakers of the draw-out type.

An object of my invention is to provide a branch line disconnecting switch contact connection that serves to permanently join two bus sections and, at the same time, provide a branch line connection for supporting a disconnecting switch contact.

A further object of my invention is to provide a disconnecting switch contact that is provided with means for preventing corona in the vicinity of the disconnecting switch contacts, and thereby reduce the space required between the disconnecting switch contacts of the bus bar system and the circuit breaker.

A further object of my invention is to provide a disconnecting switch contact that is completely shrouded in such manner that access of foreign objects is precluded.

These and other objects that will be made apparent throughout the further description of my invention are attained by means of the current distributing apparatus hereinafter described and illustrated in the accompanying drawing wherein:

The figure is a vertical section through a fragment of a bus bar connection and a disconnecting switch associated therewith.

Referring to the figure, wherein a bus connection 17 and disconnecting switch contact for a drawout type circuit breaker is shown, each feed bus section 16 comprises a copper tube 19 that is surrounded with insulating material 21, such as is usually provided about conducting cables, the insulating material being covered by a metallic sheath 22 that may be of any preferred construction.

The adjacent ends of the bus bar sections are joined by means of a copper pipe-T 23 in which the ends of the tubes 19 are inserted and joined thereto by soldering or welding. A branch terminal tube 24 is also inserted in the branch connection 25 of the pipe-T 23 and is soldered or welded thereto. After the ends of the bus sections are thus joined and the branch terminal tube 24 is assembled, the joint thus made is permanently sealed by casting a solder block 26 about the pipe-T, as indicated in the figure. Thus a good permanent conducting joint is established between sections of the bus and the branch connections and sharp corners are eliminated from the connection. The joint is then insulated by either wrapping insulating tape about it or by molding thereabout, a block of insulating material 27 having a predetermined external shape, as indicated in the figure, the insulating material extending over the tapered insulating material 21 surrounding the tubes 19, thus entirely covering the exposed ends of the tubes.

A divided metallic covering 27a surrounds the insulating material 27 and is joined to the metallic covering 22 of the bus section 16, as indicated in the figure. The casing 27a is provided with clamps 28, by means of which, the connection 17 may be secured to and suspended from the beam 7 of a supporting structure.

The branch terminal tube 24 is surrounded by an insulating tube or bushing 31 and is provided at its outer end with a contact member 32 that is adapted to be engaged by yielding contact jaws 33, mounted on a contact terminal 34 that is connected to a contact of a circuit breaker 12 and which is supported in an insulating bushing 35 secured to the casing of circuit breaker 12.

It has been found that disconnecting switch terminals having relatively high potentials, imposed thereon, have a tendency to arc across from one contact member to that of neighboring contact members due to the expansion of the corona and consequent failure of the air insulation where the contact terminals are exposed to the atmosphere. In order to prevent or reduce the corona to a minimum, the contact members are surrounded by metal bells 36 and 37 that are mounted, respectively, on the contact member 32 and the terminal 34. Since no sharp corners are presented exteriorly of the bells, corona is prevented or its formation is minimized.

The circuit breaker casing 12 is provided with a metal tube 39 that surrounds the terminal 34 and this tube telescopes over a tube 41 that is connected to the casing 27, as indicated in the figure. An annular apron 42 covers the upper end of the cylinder 39 and prevents moisture condensing on the exterior of the cylinder 41 from flowing into the cylinder 39.

In order to insulate the bell 36 from the metal telescoping cylinders 39 and 41, an insulating tube 43 is secured to the casing of the circuit breaker 12, and surrounds the bells and contact members, and telescopes into an insulating tube 44, that is secured to the insulating bushing 31. By reason of this arrangement, the contacts are adequately insulated from the metal protecting cover and the construction is such that the contacts are shielded from external objects when they are separated.

While I have illustrated but one embodiment of my invention, it will be apparent to those skilled in the art that various changes, modifications, substitutions, additions and omissions may be made in the apparatus illustrated without departing from the spirit and scope of my invention as set forth in the appended claims.

I claim as my invention:

1. A connecter comprising a pair of relatively movable contact members, a substantially semi-ellipsoidal metal bell surrounding each contact member and cooperating to substantially enclose the contact members when the latter are in closed position, a telescoping metal shroud for enclosing the said bells and telescoping insulating sleeves disposed between the shroud and the bells.

2. A connecter comprising a pair of relatively movable contact members, a substantially semi-ellipsoidal metal bell surrounding each contact member and cooperating to substantially enclose the contact members when the latter are in closed position, a casing for enclosing the bells comprising a pair of metal telescoping tubes, and an insulating tube disposed between the bells and the casing.

3. A connecter comprising a pair of relatively movable contact members, a substantially semi-ellipsoidal metal bell surrounding each contact member and cooperating to substantially enclose the contact members when the latter are in closed position, a casing for enclosing the bells comprising a pair of metal telescoping tubes, and a pair of telescoping tubes made of insulating material disposed between the bells and the said casing.

4. A connecter comprising a pair of relatively movable contact members, a substantially semi-ellipsoidal metal bell surrounding each contact member and cooperating to substantially enclose the contact members when the latter are in closed position, a casing for enclosing the bells comprising a pair of metal telescoping tubes, mounted respectively on the said contact members, and a pair of telescoping tubes made of insulating material disposed between the bells and the said casing and mounted respectively upon the said members.

5. A connecter comprising, in combination, contacts affording at least one gap between which an arc may form, and at least one guard of conducting material for and electrically connected to each contact for modifying the distribution of potential in the gap between the contacts, the said guards having adjacent edges when the contacts are closed and being so disposed in relation to their respective contacts that, from the time arcing commences, the edges of the guards will be slightly behind the tips of their respective contacts so that the edges of the guards are farther from one another than are the tips of the contacts.

6. A connecter comprising, in combination, a pair of relatively movable contact members, a metal guard surrounding each contact member and cooperating to substantially enclose the contact members when the latter are in closed position, the said guards having adjacent edges when the contacts are closed and being so disposed in relation to their respective contacts that the edges of the guards are farther from one another than are the tips of the contacts when the contacts are open.

KARL C. RANDALL.